No. 863,689. PATENTED AUG. 20, 1907.
H. W. AVERY & W. S. JUDD.
ARMORED PNEUMATIC TIRE.
APPLICATION FILED FEB. 3, 1905.
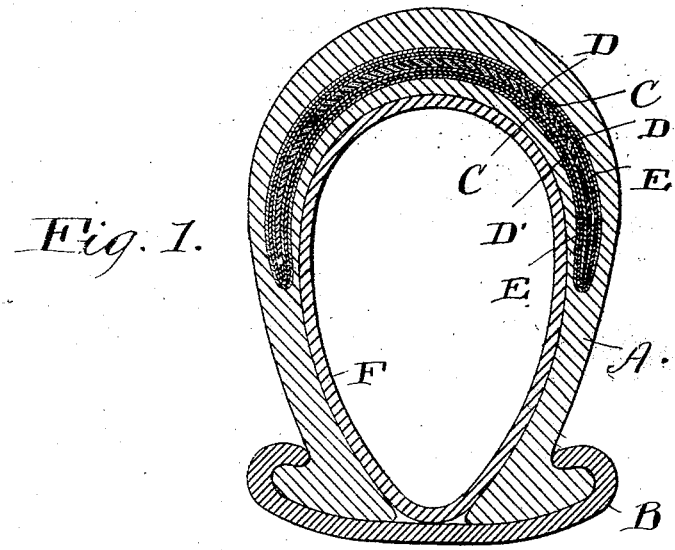
Fig. 1.
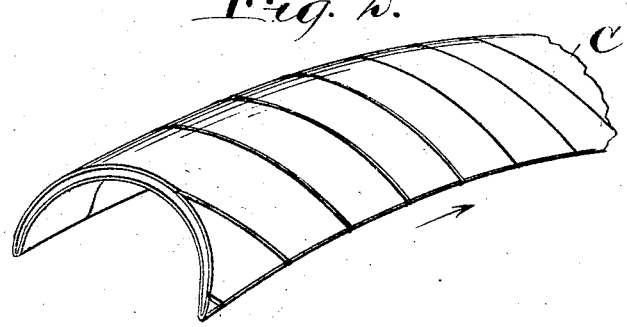
Fig. 2.
Fig. 3.
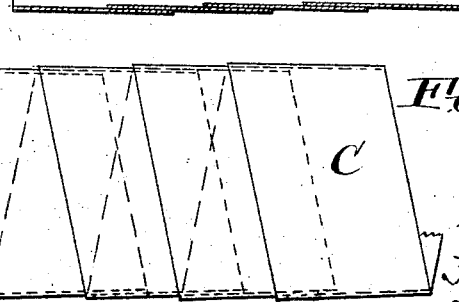
Fig. 4.
Witnesses.
E. B. Gilchrist
J. S. Kohn
Inventors.
Henry W. Avery,
Wallace S. Judd
By Thurston & Bates,
attorneys.

UNITED STATES PATENT OFFICE.

HENRY W. AVERY AND WALLACE S. JUDD, OF CLEVELAND, OHIO.

ARMORED PNEUMATIC TIRE.

No. 863,689.　　　　　Specification of Letters Patent.　　　　Patented Aug. 20, 1907.

Application filed February 3, 1905. Serial No. 243,920.

*To all whom it may concern:*

Be it known that we, HENRY W. AVERY and WALLACE S. JUDD, both citizens of the United States, and both residing at Cleveland, in the county of Cuyahoga and State of Ohio, have invented a certain new and useful Improvement in Armored Pneumatic Tires, of which the following is a full, clear, and exact description, reference being had to the accompanying drawings.
The object of this invention is to provide a cheap and efficient armored tire for automobile use, which shall effectually protect the inner tube from puncture, without interfering with the resilience, the appearance, or wear of the outer sheath.
To this end our invention consists of a strip of puncture resisting material wound spirally upon itself, and pressed into a sort of crescent form in cross section, embedded within the sheath, extending continuously around the wheel. Such metal shield effectively protects the inner tube from puncture.

As the wheel rotates and the lower portion of the tire flattens the spiral tube slides into or out of itself to accommodate itself thereto. To prevent this sliding from wearing the outer sheath, we may put rubber or other material within the interior of the tubular shield, and also along the outside thereof. Such composite structure may then be covered with canvas, and the whole embedded and vulcanized within the outer sheath. This is the embodiment of the invention shown in the drawings, and is comprised within the broader invention, as set out in the claims thereof.

In the drawings, Figure 1 is a cross section through a tire embodying our invention; Fig. 2 is a perspective view of the metal shield; Fig. 3 is a longitudinal section of the shield and Fig. 4 is a plan of the shield shown in Fig. 3. These last two figures show the shield after the metal strip constituting it has been wound spirally and flattened but before it has been curved into the form shown in Fig. 2.

Referring first to Fig. 1, A represents an ordinary outer sheath, which is shown as of the clencher type, held in place on a suitable rim B, and carrying an inner tube F. Within the tread portion of the sheath A, is mounted our shield C. This shield consists, preferably, of a strip of thin sheet metal wound upon itself to make a helical tube, which is then flattened and curved into an attenuated crescent shape in transverse section, as shown, and curved longitudinally into an annulus, the meeting ends being secured together.
Fig. 1 shows a lining of rubber or other material D between the two members C of the shield. Outside of these two members is also shown a coating of rubber D', D', and outside of this is an inclosing sack of canvas E. This canvas is vulcanized in place within the sheath. As the sheath flattens on the under side of the wheel, the consecutive plies of the shield telescope into or out of one another. This may cause some wear or grating of the rubber D and D', but this is immaterial, as this rubber is all contained within the canvas E, and the wear does not reach the sheath itself.

The tires are made rights and lefts, so that the wheel may be rotating in the direction to cause the consecutive plies of the shield to pass over the ground with the laps upward preventing the edges cutting, pinching or abrading the adjacent material. By this means the wear which the shield would cause is much reduced. The arrow in Fig. 2 shows the direction in which the wheels should rotate.

We claim:

1. As a new article of manufacture an armored tire sheath having embedded in it a spirally wound protecting member whose edges overlap to present a double protection and allow easy telescoping of the parts, the tubular sheath being flattened and curved transversely and longitudinally to correspond to the tire.

2. In a vehicle tire, in combination, an outer sheath and a protecting shield embedded therein and comprising a flat sheet metal strip wound with overlapping edges and flattened and curved to make an approximately crescent shape in cross section.

3. In a vehicle tire, in combination, an outer sheath and a protecting shield embedded therein and comprising a flat strip wound with overlapping edges and flattened and curved to make an approximately crescent shape in cross section and a lining placed within such tubular shield.

4. In a vehicle tire, in combination, an outer sheath and a protecting shield embedded therein and comprising a flat sheet metal strip wound with overlapping edges and flattened and curved, and a canvas covering for such tubular shield vulcanized within the tread of the sheath.

5. In a vehicle tire, in combination, an outer sheath and a protecting shield embedded therein and comprising a flat sheet metal strip wound with overlapping edges and flattened and curved to make an approximately crescent shape in cross section, a lining within the tubular shield, a covering outside thereof, and a canvas sack inclosing the shield and lining and cover, said parts being all vulcanized within the tread of the sheath.

6. In combination, a vehicle tire of flexible material and a protecting shield comprising a continuous spirally wound member whose edges overlap, which member is compressed to substantially a crescent form in cross section.

In testimony whereof, we hereunto affix our signatures in the presence of two witnesses.

HENRY W. AVERY.
　　　　　　　　　　　WALLACE S. JUDD.

Witnesses:
　ALBERT H. BATES,
　E. L. THURSTON.